United States Patent [19]

Nielinger et al.

[11] 4,250,297

[45] Feb. 10, 1981

[54] TRANSPARENT COPOLYAMIDE FROM ISOPHALIC ACID REACTANT

[75] Inventors: Werner Nielinger; Bert Brassat; Hugo Vernaleken, all of Krefeld, Fed. Rep. of Germany

[73] Assignee: Bayer Aktiengesellschaft, Fed. Rep. of Germany

[21] Appl. No.: 76,484

[22] Filed: Sep. 17, 1979

Related U.S. Application Data

[63] Continuation of Ser. No. 950,387, Oct. 11, 1978, abandoned, which is a continuation-in-part of Ser. No. 818,211, Jul. 22, 1977, abandoned.

[30] Foreign Application Priority Data

Nov. 18, 1976 [DE] Fed. Rep. of Germany ....... 2652465

[51] Int. Cl.³ ............................................. C08G 69/26
[52] U.S. Cl. .................................. 528/340; 528/336; 528/349; 260/33.4 P
[58] Field of Search ............................... 528/349, 340

[56] References Cited

U.S. PATENT DOCUMENTS 3,294,758  12/1966  Gabler .................................. 528/349

Primary Examiner—Harold D. Anderson
Attorney, Agent, or Firm—Connolly and Hutz

[57] ABSTRACT

Transparent copolyamides consisting essentially of isophthalic acid, hexamethylene diamine and trimethylhexamethylene diamine.

3 Claims, No Drawings

TRANSPARENT COPOLYAMIDE FROM ISOPHTHALIC ACID REACTANT

CROSS-REFERENCE TO RELATED APPLICATION

This application is a continuation of application Ser. No. 950,387 filed Oct. 11, 1978 and now abandoned which, in turn, is a continuation-in-part of application Ser. No. 818,211 filed July 22, 1977 and now abandoned.

This invention relates to transparent copolyamides of isophthalic acid, hexamethylene diamine and trimethyl hexamethylene diamine.

Polyamides of isophthalic acid and hexamethylene diamine are known from U.S. Pat. Nos. 2,715,620 and 2,742,496. Unfortunately, their dimensional stability at elevated temperatures respectively their second transition temperature are inadequate for certain applications. In order to solve this problem, it has been proposed to use terephthalic acid instead of isophthalic acid.

Although the melting temperature of the products is increased thereby, no increase in the second transition temperature is obtained. However, the second transition temperature is the mean measure for the dimensional stability of amorphous polymers.

In the U.S. patent specification No. 3294 758 polyamides obtained by polycondensing isophthalic acid and mixtures of 95 to 70% by weight of substituted polymethylene diamines and 5 to 30% by weight of unsubstituted polymethylene diamines are described. Their resistance to organic solvents is not sufficient.

By replacing only part of the hexamethylene diamine by the isomer mixture of 2,2,4- and 2,4,4-trimethyl hexamethylene diamine it is surprisingly possible not only to increase the second transition temperature of polyamides of isophthalic acid and hexamethylene diamine, but also to obtain copolyamides with an unexpected resistance to organic solvents such as methyl alcohol alone or in admixture with water.

Accordingly, the present invention relates to copolyamides consisting of a, from 50 to 99 mole %, preferably from 60 to 90 mole %, of the following units:

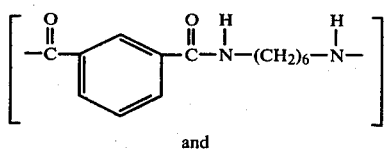

and (b) from 50 to 1 mole %, preferably from 40 to 10 mole %, of the following units:

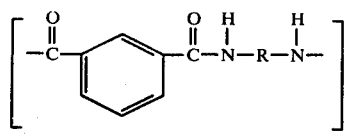

wherein R represents:

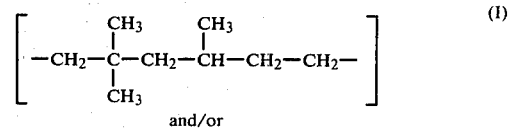

and/or

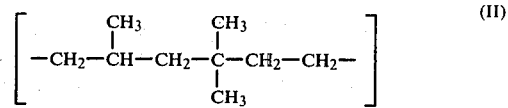

the sum of (a) and (b) being always 100%.

Preferred copolyamides are copolyamides which contain the two units (I) and (II) in substantially equal quantities, resulting from the use of commercially available isomer mixtures of 2,2,4- and 2,4,4-trimethyl hexamethylene diamine.

The copolyamides are produced by the known methods by polycondensing diamines and dicarboxylic acids. Thus, the mixture of isophthalic acid, hexamethylene diamine and trimethyl hexamethylene diamine may be heated to temperatures of from 190° to 230° C. After this precondensation reaction, polycondensation is completed at temperatures of from 240° to 300° C.

This precondensation reaction may take place in the presence or absence of water. It may be carried out at atmospheric pressure or in closed autoclaves under the vapour pressure of the water.

In order to obtain extremely light coloured products, it is advantageous to carry out the polycondensation reaction starting from the salts of the monomers.

The amine mixture consists of from 50 to 99 mole parts, preferably from 60 to 90 mole %, of hexamethylene diamine and from 50 to 1, preferably from 40 to 10, mole % of the methyl-substituted diamine.

Losses of diamine occurring during the polycondensation reaction are compensated by adding or using an excess of hexamethylene diamine.

The molecular weight of the polyamides may be regulated by the addition of carboxylic acids or amines, preferably by benzoic acid, sebacic acid or an excess of isophthalic acid.

The relative viscosity of the copolyamides according to the present invention should be above 2, preferably between 2.4 and 3.5, as measured of a 1% solution of the polyamide in m-cresol at 25° C. in an Unbelohde viscosimeter. The copolyamides are transparent and can be thermoplastically processed without difficulty. They can contain auxiliaries and additives, for example lubricants, mould release agents, dyes, glass fibres, fillers or flameproofing agents. The copolyamides may be used for the production of fibres, films and transparent shaped articles, such as sheets and injection mouldings.

EXAMPLE 1

9.035 kg (32 moles) of the salt of isophthalic acid and hexamethylene diamine, 1.266 kg (8 moles) of trimethyl hexamethylene diamine (the trimethyl hexamethylene diamine is an isomer mixture of substantially equal parts of 2,2,4- and 2,4,4-trimethyl hexamethylene diamine) and 1.329 kg (8 moles) of isophthalic acid are introduced into an autoclave. 78 g of benzoic acid are added to stabilise the molecular weight, whilst 128 g of hexamethylene diamine are added to compensate the losses of diamine occurring during polycondensation. Polycondensation is carried out, with stirring, under nitrogen, for 2 hours at 210° C. and then for 6 hours at 270°

C. The polyamide is then run off in the form of a bristle through a water bath, granulated and dried. An almost colourless transparent product is obtained which has a second transition temperature of 140° C., as determined by differential thermoanalysis.

COMPARISON EXAMPLE 1

A polyamide is produced from the salt of isophthalic acid and hexamethylene diamine in the same way as described in Example 1, but without the addition of trimethyl hexamethylene diamine. The second transition temperature of this polyamide is 130° C.

EXAMPLE 2

Transparent copolyamides are produced as described in Example 1 from isophthalic acid, hexamethylene diamine and the isomer mixture of 2,2,4- and 2,4,4-trimethyl hexamethylene diamine, the molar ratio of the diamine components being varied as set forth in Table I. The second transition temperatures are shown in Table I.

TABLE I

| Molar ratio | | |
|---|---|---|
| Hexamethylene diamine | : Trimethyl hexamethylene diamine | Second transition temperature °C. |
| 95 | : 5 | 135 |
| 90 | : 10 | 138 |
| 70 | : 30 | 141 |

We claim:

1. A solid copolyamide consisting of from 60 to 90 mole % of units of the formula

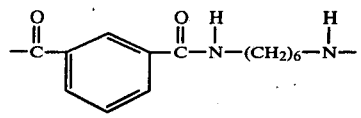

and from 40 to 10 mole % of units of the formula

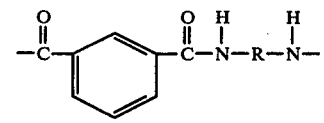

wherein R is at least one member selected from the group consisting of (I)

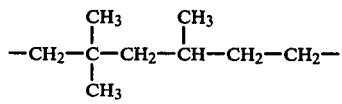

and (II)

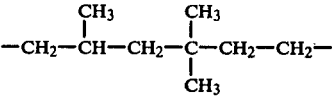

2. A copolyamide as claimed in claim 1 in which the radicals (I) and (II) are present in a ratio of from 40:60 to 60:40.

3. A transparent shaped article consisting essentially of a copolyamide of claim 1.

* * * * *